(12) United States Patent
Kato et al.

(10) Patent No.: US 9,631,708 B2
(45) Date of Patent: Apr. 25, 2017

(54) AUTOMATIC TRANSMISSION

(71) Applicant: AISIN AW CO., LTD., Anjo-shi, Aichi-ken (JP)

(72) Inventors: Hiroshi Kato, Kariya (JP); Nobutada Sugiura, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/101,334

(22) PCT Filed: Jan. 13, 2015

(86) PCT No.: PCT/JP2015/050598
§ 371 (c)(1),
(2) Date: Jun. 2, 2016

(87) PCT Pub. No.: WO2015/108017
PCT Pub. Date: Jul. 23, 2015

(65) Prior Publication Data
US 2016/0305511 A1 Oct. 20, 2016

(30) Foreign Application Priority Data
Jan. 14, 2014 (JP) .................. 2014-004224

(51) Int. Cl.
*F16H 3/66* (2006.01)
*F16H 3/62* (2006.01)

(52) U.S. Cl.
CPC ............ *F16H 3/666* (2013.01); *F16H 3/62* (2013.01); *F16H 3/66* (2013.01); *F16H 2200/006* (2013.01); *F16H 2200/0052* (2013.01); *F16H 2200/2007* (2013.01); *F16H 2200/2043* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 4,224,838 | A | 9/1980 | Roushdy et al. |
| 5,106,352 | A | 4/1992 | Lepelletier |

(Continued)

FOREIGN PATENT DOCUMENTS

| | | |
|---|---|---|
| DE | 2945224 A1 | 6/1980 |
| DE | 10162888 A1 | 7/2003 |

(Continued)

OTHER PUBLICATIONS

Apr. 7, 2015 Search Report issued in International Patent Application No. PCT/JP2015/050598.

(Continued)

*Primary Examiner* — Justin Holmes
(74) *Attorney, Agent, or Firm* — Oliff PLC

(57) ABSTRACT

An automatic transmission wherein the intermediate gear and the reduced-speed rotation output are coupled to each other via a first clutch, the second ring gear and the input are coupled to each other via a second clutch, the first sun gear and the reduced-speed rotation output are coupled to each other via a third clutch, the first sun gear is coupled to a first lock, the second ring gear is coupled to a second lock, and the common carrier is coupled to an output member.

5 Claims, 6 Drawing Sheets

(56) References Cited

U.S. PATENT DOCUMENTS

| | | | | |
|---|---|---|---|---|
| 8,545,362 B1* | 10/2013 | Goleski | ............... | F16H 3/66 |
| | | | | 475/277 |
| 8,574,113 B1* | 11/2013 | Goleski | ............... | F16H 3/66 |
| | | | | 475/282 |
| 2004/0229725 A1 | 11/2004 | Hiraiwa | | |
| 2011/0009228 A1 | 1/2011 | Bauknecht et al. | | |
| 2012/0065020 A1 | 3/2012 | Mellet et al. | | |
| 2012/0231920 A1 | 9/2012 | Wittkopp et al. | | |
| 2013/0310210 A1* | 11/2013 | Mellet | ............... | F16H 3/62 |
| | | | | 475/275 |
| 2014/0364270 A1* | 12/2014 | Vernon | ............... | F16H 3/62 |
| | | | | 475/284 |
| 2015/0038282 A1 | 2/2015 | Otake et al. | | |

FOREIGN PATENT DOCUMENTS

| | | | |
|---|---|---|---|
| JP | H04-219553 A | 8/1992 |
| JP | 2001-082555 A | 3/2001 |
| JP | 2004-340318 A | 12/2004 |
| JP | 2011-080589 A | 4/2011 |
| JP | 2011-513661 A | 4/2011 |
| WO | 2013/146025 A1 | 10/2013 |

OTHER PUBLICATIONS

Beitz, W & Kuettner, K. H. Dubbel: Taschenbuch für den Maschinenbau. 18. Auflage. Berlin, Heidelberg: Springer, 1995.
Aug. 1, 2016 partial translation of Office Action issued in German Patent Application No. 11 2015 000 304.5.

* cited by examiner

FIG.2

$\lambda 1=0.556$   $\lambda 2=0.509$   $\lambda 3=0.667$   SPREAD 5.889

|     | C-1 | C-2 | C-3 | B-1 | B-2 | GEAR RATIO | STEP |
|-----|-----|-----|-----|-----|-----|------------|------|
| 1st | ○   |     |     |     | ○   | 3.889      | 1.656 |
| 2nd | ○   |     |     | ○   |     | 2.348      | 1.509 |
| 3rd | ○   |     | ○   |     |     | 1.556      | 1.333 |
| 4th | ○   | ○   |     |     |     | 1.167      | 1.381 |
| 5th |     | ○   | ○   |     |     | 0.845      | 1.279 |
| 6th |     | ○   |     | ○   |     | 0.660      |      |
| Rev |     |     | ○   |     | ○   | 3.025      | 0.778 |

FIG.5

|     | C-1 | C-2 | C-3 | C-4 | B-1 | B-2 |
|-----|-----|-----|-----|-----|-----|-----|
| 1st | ○   |     |     |     |     | ○   |
| 2nd | ○   |     |     |     | ○   |     |
| 3rd | ○   |     | ○   |     |     |     |
| 4th | ○   |     |     | ○   |     |     |
| 5th | ○   | ○   |     |     |     |     |
| 6th |     | ○   |     | ○   |     |     |
| 7th |     | ○   | ○   |     |     |     |
| 8th |     | ○   |     |     | ○   |     |
| Rev |     |     | ○   |     |     | ○   |

AUTOMATIC TRANSMISSION

BACKGROUND

The present disclosure relates to an automatic transmission to be mounted on an automobile or the like, and in particular to an automatic transmission that has a planetary gear set (unit) composed of a speed-reduction gear mechanism and four rotary elements.

There has hitherto been an automatic transmission which uses a Ravigneaux type planetary gear, for example, as a planetary gear set that has four rotary elements, and in which reduced-speed rotation from a speed-reduction gear mechanism and/or direct-coupling rotation from an input shaft is input to a plurality of different elements of the planetary gear via respective clutches, the clutches are engaged and disengaged as appropriate, and predetermined elements of the planetary gear set are made stationary by a brake to establish a multiplicity of shift speeds such as six forward speeds and one reverse speed (see Japanese Patent Application Publication No. H4-219553).

Adopting a Ravigneaux type planetary gear or the like enables the automatic transmission to set gear ratios with a high degree of freedom with a relatively simple configuration.

SUMMARY

It has recently been desired that an automatic transmission should be made further more compact in the axial direction in order to install a hybrid device of a one-motor type in which an electric motor is interposed between an engine and the automatic transmission, a high-performance damper (torsion spring) device, or the like.

The automatic transmission adopts a Ravigneaux type planetary gear as the planetary gear set, and is relatively short in the axial direction. However, the Ravigneaux type planetary gear includes two sun gears arranged side by side in the axial direction and requires a long pinion, and is not good enough to make the automatic transmission further shorter in the axial direction.

An exemplary aspect of the present disclosure provides an automatic transmission that adopts a planetary gear that is short in the axial direction as a planetary gear set to make it possible to obtain adequate gear ratios (step ratios) while meeting requirements for making the automatic transmission shorter as described above.

An exemplary aspect of the present disclosure provides an automatic transmission including: a reduced-speed rotation output that outputs input rotation of an input with a speed of the input rotation reduced; and a planetary gear set that has a first sun gear, an integral intermediate gear in which a first ring gear is formed on an inner peripheral side and a second sun gear is formed on an outer peripheral side, a second ring gear, and a common carrier that rotatably supports a first pinion and a second pinion, the first pinion being meshed with the first sun gear and the first ring gear, and the second pinion being meshed with the second sun gear and the second ring gear and disposed so as to at least partially overlap the first pinion in an axial direction as seen from a radial direction, wherein the intermediate gear and the reduced-speed rotation output are coupled to each other via a first clutch, the second ring gear and the input are coupled to each other via a second clutch, the first sun gear and the reduced-speed rotation output are coupled to each other via a third clutch, the first sun gear is coupled to a first lock, the second ring gear is coupled to a second lock, and the common carrier is coupled to an output member.

Another exemplary aspect of the present disclosure provides that a first forward speed is established by engaging the first clutch and the second lock; a second forward speed is established by engaging the first clutch and the first lock; a third forward speed is established by engaging the first clutch and the third clutch; a fourth forward speed is established by engaging the first clutch and the second clutch; a fifth forward speed is established by engaging the second clutch and the third clutch; a sixth forward speed is established by engaging the second clutch and the first lock; and a reverse speed is established by engaging the third clutch and the second lock.

Another exemplary aspect of the present disclosure provides a speed-reduction gear mechanism that outputs the input rotation of the input to the reduced-speed rotation output with the speed of the input rotation reduced, wherein: the speed-reduction gear mechanism includes a single-pinion planetary gear that includes a sun gear, a ring gear, and a carrier that has a pinion meshed with the sun gear and the ring gear; and the sun gear is fixed, the ring gear is coupled to the input, and the carrier serves as the reduced-speed rotation output Another exemplary aspect of the present disclosure provides a fourth clutch that is capable of coupling the input and the first sun gear to each other, wherein: a first forward speed is established by engaging the first clutch and the second lock; a second forward speed is established by engaging the first clutch and the first lock; a third forward speed is established by engaging the first clutch and the third clutch; a fourth forward speed is established by engaging the first clutch and the fourth clutch; a fifth forward speed is established by engaging the first clutch and the second clutch; a sixth forward speed is established by engaging the second clutch and the fourth clutch; a seventh forward speed is established by engaging the second clutch and the third clutch; an eighth forward speed is established by engaging the second clutch and the first lock; and a reverse speed is established by engaging the third clutch and the second lock.

Another exemplary aspect of the present disclosure provides a speed-reduction gear mechanism that outputs the input rotation of the input to the reduced-speed rotation output with the speed of the input rotation reduced, wherein: the speed-reduction gear mechanism includes a double-pinion planetary gear that includes a sun gear, a ring gear, and a carrier that has a first pinion and a second pinion, the first pinion being meshed with the sun gear, and the second pinion being meshed with the ring gear and meshed with the first pinion; and the sun gear is fixed, the carrier is coupled to the input, and the ring gear serves as the reduced-speed rotation output.

According to an exemplary aspect of the disclosure, the planetary gear set includes the integral intermediate gear which has the first ring gear on the inner peripheral side and the second sun gear on the outer peripheral side, and has a two-storied structure in which the first planetary gear which has the first ring gear is disposed on the radially inner side and the second planetary gear which has the second sun gear is disposed on the radially outer side. The planetary gear set can be made shorter in the axial direction, which enables the automatic transmission to be mounted even if a space for mounting the automatic transmission in the axial direction is limited with an electric motor or a high-performance damper device disposed between an engine and the automatic transmission, for example.

With the first planetary gear and the second planetary gear forming a two-storied structure, the automatic transmission is large in the radial direction, which makes it difficult for the automatic transmission to obtain desired gear ratios. However, rotation of the input shaft is input to the second ring gear, which is positioned on the radially outer side, via the second clutch, reduced-speed rotation from the reduced-speed rotation output is selectively input to the intermediate gear via the first clutch or to the first sun gear via the third clutch, and the common carrier is coupled to the output member, which allows the automatic transmission to obtain adequate gear ratios.

According to an exemplary aspect of the disclosure, the first clutch, the second clutch, the third clutch, the first lock, and the second lock can be engaged as appropriate to obtain a multi-speed transmission with six forward speeds and one reverse speed.

According to an exemplary aspect of the disclosure, a single-pinion planetary gear is used as the speed-reduction gear mechanism which outputs rotation of the input to the reduced-speed rotation output with the speed of the rotation reduced. This enables space saving in addition to simplifying the structure of the speed-reduction gear mechanism, and makes it possible to obtain an automatic transmission that is made shorter in the axial direction in combination with the planetary gear set which is made shorter in the axial direction. In the single-pinion planetary gear, in addition, the sun gear is fixed, the ring gear is coupled to the input. and the carrier serves as the reduced-speed rotation output. Thus, the single-pinion planetary gear can be applied to the six-speed automatic transmission to obtain adequate gear ratios.

According to an exemplary aspect of the disclosure, the automatic transmission includes the fourth clutch which couples the input and the first sun gear to each other, and the first clutch, the second clutch, the third clutch, the fourth clutch, the first lock, and the second lock can be engaged as appropriate to obtain a multi-speed transmission with eight forward speeds and one reverse speed.

According to an exemplary aspect of the disclosure, the speed-reduction gear mechanism includes a double-pinion planetary gear, which makes it possible to obtain an automatic transmission that is made shorter in the axial direction in combination with the planetary gear set described above. In the double-pinion planetary gear, in addition, the sun gear is fixed, the carrier is coupled to the input, and the ring gear serves as the reduced-speed rotation output. Thus, the carrier which is coupled to the input and the first sun gear of the planetary gear set can be coupled to each other via the fourth clutch, and the double-pinion planetary gear can be applied to the eight-speed automatic transmission to obtain adequate gear ratios.

BRIEF DESCRIPTION OF THE DRAWINGS

FIG. 2 is a diagram (engagement table) illustrating the engagement of engagement elements at each shift speed.

FIG. 5 is a diagram (engagement table) illustrating the engagement of engagement elements at each shift speed.

DETAILED DESCRIPTION OF EMBODIMENTS

Figure 1:
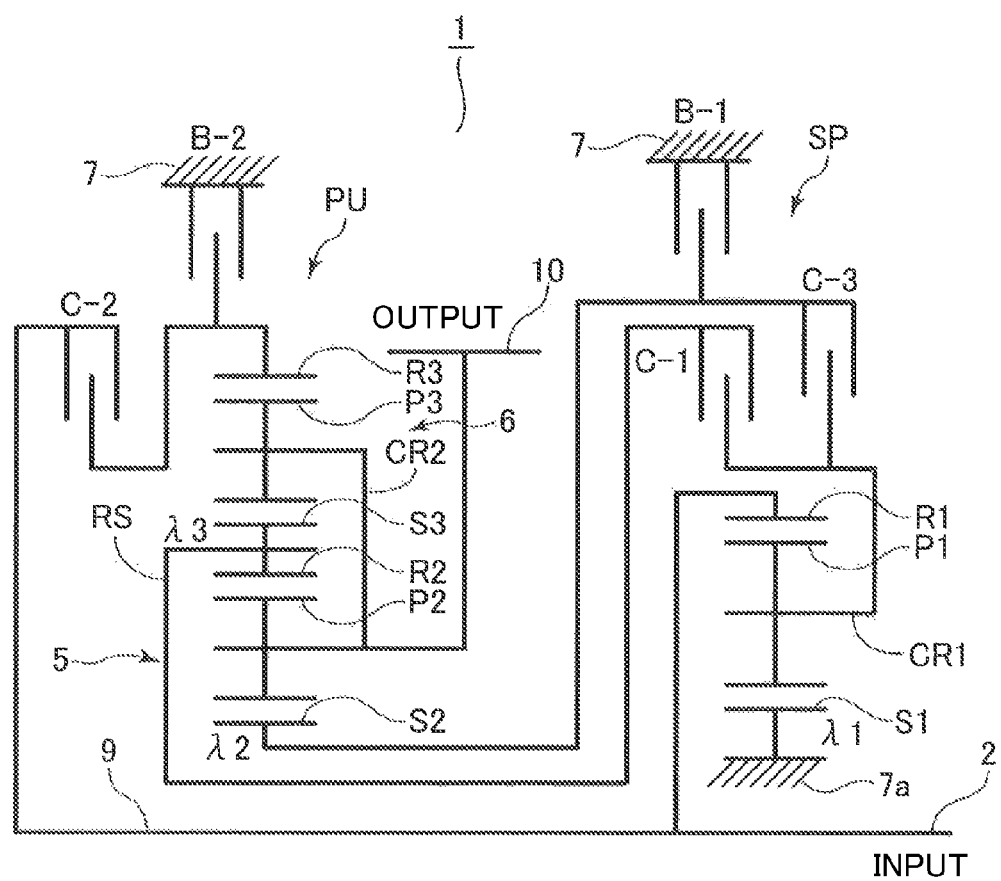
FIG. 1 is a schematic (skeleton) diagram of an automatic transmission according to a first embodiment of the present disclosure.
Figure 3:
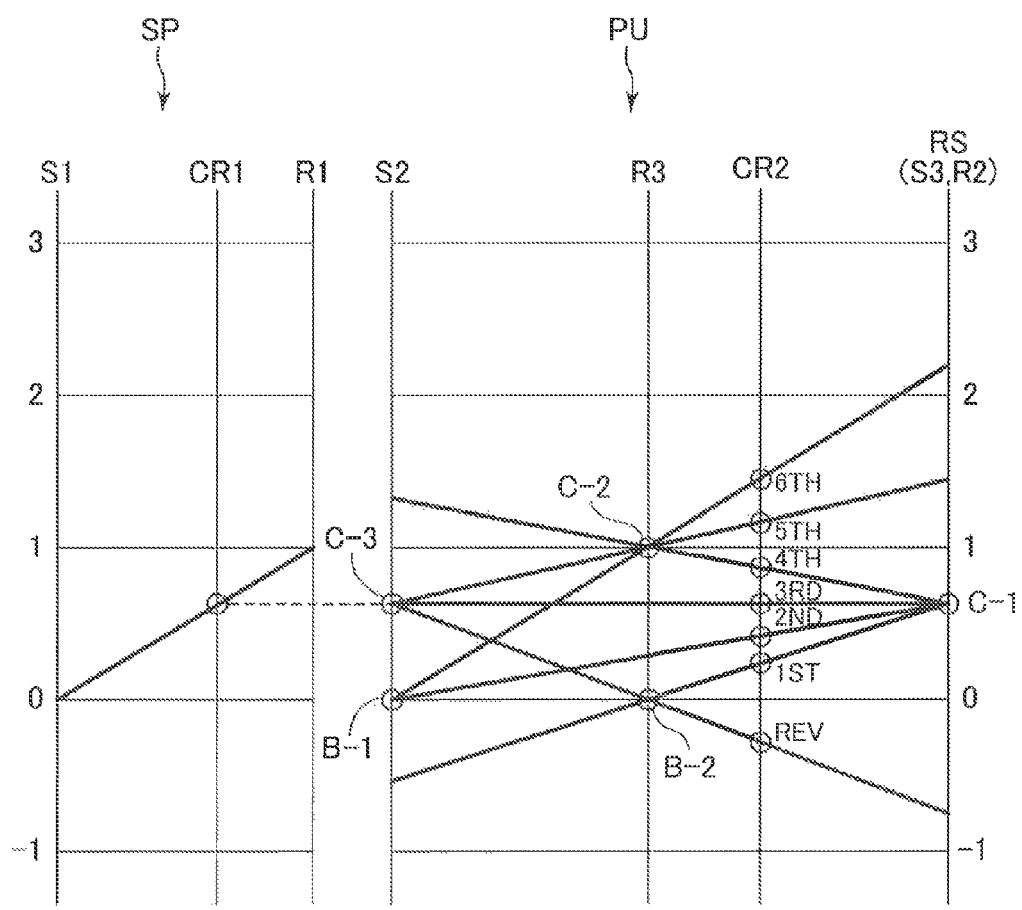
FIG. 3 is a velocity diagram therefor.

A first embodiment of the present disclosure will be described below with reference to FIGS. 1 to 3. First, a schematic configuration of an automatic transmission 1 according to the embodiment will be described with reference to FIG. 1. As illustrated in FIG. 1, the automatic transmission 1, which is suitable for use in front-engine front-drive (FF) vehicles, for example, includes an input shaft (input) 2 that is connectable to an engine via a torque converter (not illustrated), and a speed-reduction planetary gear (speed-reduction gear mechanism) SP and a planetary gear unit (planetary gear set) PU provided on the input shaft 2.

The planetary gear SP is a so-called single-pinion planetary gear, which includes a sun gear S1, a carrier (input-side rotary system) CR1, and a ring gear R1 and in which the carrier CR1 has a pinion P1 meshed with the sun gear S1 and the ring gear R1. A gear ratio $\lambda 1$ of the planetary gear SP (the number of teeth of the sun gear S1/the number of teeth of the ring gear R1) is set to the range of 0.50 to 0.61, and set to 0.556 in the embodiment.

Meanwhile, the planetary gear unit (set) PU has four rotary elements, namely a first sun gear S2, an intermediate gear RS formed of an integral composite gear in which a first ring gear R2 is formed on the inner peripheral side and a second sun gear S3 is formed on the outer peripheral side, a second ring gear R3, and a carrier CR2. The carrier CR2 has a first pinion P1 composed of a plurality of short pinions meshed with the first sun gear S2 and the second ring gear R3 and a second pinion P2 composed of a plurality of short pinions meshed with the second sun gear S3 and the first ring gear R2. The first pinion P2 and the second pinion P3 are supported so as to be rotatable and revolvable on the same common carrier CR2. The planetary gear unit PU is a so-called two-storied planetary gear set, in which the gears S2, RS, R2, P2, and P3 are disposed so as to include an identical plane that is orthogonal to the input shaft 2 and in which a first planetary gear 5 composed of the first sun gear S2, the first pinion P2, and the first ring gear R2 and a second planetary gear 6 composed of the second sun gear S3, the second pinion P3, and the second ring gear R3 overlap each other in the radial direction in the identical plane. In the two-storied planetary gear set, the first pinion P2 and the second pinion P3 are disposed so as to at least partially overlap each other in the axial direction as seen from the radial direction. A gear ratio $\lambda 2$ of the first planetary gear 5 (the number of teeth of the first sun gear S2/the number of teeth of the first ring gear R2) of the planetary gear unit PU is set to the range of 0.45 to 0.56, and set to 0.509 in the embodiment. A gear ratio $\lambda 3$ of the second planetary gear 6 (the number of teeth of the second sun gear S3/the number of teeth of the second ring gear R3) is set to the range of 0.61 to 0.72, and set to 0.667 in the embodiment.

The sun gear S1 of the planetary gear SP is connected to a boss portion 7a integrally fixed to the transmission case 7 (not illustrated) so as not to be rotatable. The ring gear R1 makes the same rotation (hereinafter referred to as "input rotation") as rotation of the input shaft 2. Furthermore, the carrier CR1 serves as a reduced-speed rotation output portion (reduced-speed rotation output) that outputs reduced-speed rotation which is reduced in speed compared to the input rotation by the sun gear S1 which is fixed and the carrier CR1 which makes the input rotation. The carrier CR1 is connected to a first clutch C-1 and a third clutch C-3.

The first sun gear S2 of the planetary gear unit PU is connected to a first brake B-1 (lock) so as to be held stationary to the transmission case 7. The first sun gear S2 is connected to the third clutch C-3 so as to receive the reduced-speed rotation of the carrier CR1 via the clutch C-3. In addition, the intermediate gear RS of the planetary gear unit PU is connected to the first clutch C-1 so as to receive the reduced-speed rotation of the carrier CR1.

Furthermore, the first ring gear R2 of the planetary gear unit PU is connected to a second clutch C-2, to which rotation of the input shaft 2 is input via an intermediate shaft 9, so as to receive the input rotation via the clutch C-2, and also connected to a second brake B-2 (lock) so as to be held stationary to the transmission case 7 via the brake B-2. The carrier CR2 is connected to an output gear 10 that outputs rotation to drive wheels (not illustrated). A one-way clutch may be provided side by side with the first brake and/or the second brake.

Next, operation of the automatic transmission 1 will be described with reference to the configuration described above. In the velocity diagram illustrated in FIG. 3, the vertical axes indicate the rotational speeds of the respective rotary elements (respective gears), and the horizontal axes correspond to the gear ratios of the rotary elements. In a portion of the velocity diagram for the planetary gear SP, the vertical axis at an end portion in the transverse direction (on the left side in FIG. 3) corresponds to the sun gear S1, and the vertical axes on the right side onward sequentially correspond to the carrier CR1 and the ring gear R1. In a portion of the velocity diagram for the planetary gear unit PU, further, the vertical axis at an end portion in the transverse direction (on the right side in FIG. 3) corresponds to the integral intermediate gear RS which is composed of the first ring gear R2 and the second sun gear S3, and the vertical axes on the left side onward sequentially correspond to the common carrier CR2 which serves as an output member, the second ring gear R3, and the first sun gear S2.

For example, in the drive (D) range, and when the first forward speed (1st) is established, as illustrated in FIG. 2, the first clutch C-1 and the second brake B2 are engaged. Then, in the speed-reduction planetary gear SP, rotation of the carrier CR1, which makes reduced-speed rotation with the sun gear S1 fixed and with the ring gear R1 making the input rotation, is input to the intermediate gear RS via the first clutch C-1. In the planetary gear unit PU, in addition, rotation of the second ring gear R3 of the intermediate gear RS is locked by the second brake B-2. Then, the reduced-speed rotation input to the second sun gear S3 of the intermediate gear RS is reduced in speed by the second ring gear R3 which is fixed and output to the common carrier CR2 so that forward rotation with the first forward speed is output from the output gear 10. In this state, a first speed with a gear ratio of 3.889 is established by the reduced-speed rotation based on the gear ratio λ1 of the speed-reduction planetary gear SP and changed-speed rotation based on the gear ratio λ3 of the second planetary gear 6 of the planetary gear unit PU.

When the second forward speed (2nd) is established, as illustrated in FIG. 2, the first clutch C-1 is engaged, and the first brake B-1 is locked. Then, in the speed-reduction planetary gear SP, rotation of the carrier CR1, which makes reduced-speed rotation with the sun gear S1 fixed and with the ring gear R1 making the input rotation, is input to the intermediate gear RS of the planetary gear unit PU via the first clutch C-1. In addition, rotation of the first sun gear S2 is locked by locking of the first brake B-1. Then, the reduced-speed rotation input to the first ring gear R2 of the intermediate gear RS is reduced in speed by the first sun gear S2 which is fixed and output from the common carrier CR2 so that reduced-speed forward rotation with the second forward speed is output from the output gear 10. In this state, a second speed with a gear ratio of 2.348 is established by the reduced-speed rotation based on the gear ratio λ1 of the speed-reduction planetary gear SP and the reduced-speed rotation based on the gear ratio λ2 of the first planetary gear 5 of the planetary gear unit PU. Thus, an adequate step ratio (the gear ratio of the first speed/the gear ratio of the second speed) of 1.656 is established between the first speed and the second speed.

When the third forward speed (3rd) is established, as illustrated in FIG. 2, the first clutch C-1 and the third clutch C-3 are engaged. Then, in the speed-reduction planetary gear SP, rotation of the carrier CR1, which makes reduced-speed rotation with the sun gear S1 fixed and with the ring gear R1 making the input rotation, is input to the second ring gear R2 of the intermediate gear RS of the planetary gear unit PU via the first clutch C-1. In addition, the reduced-speed rotation of the carrier CR1 is input to the first sun gear S2 through engagement of the third clutch C-3. That is, the reduced-speed rotation of the carrier CR1 is input to the first sun gear S2 and the second sun gear S3. Therefore, the first planetary gear 5 is brought into a directly coupled state. Thus, the planetary gear unit PU is brought into a directly coupled state, changed-speed rotation of the speed-reduction planetary gear SP is output as it is to the common carrier CR2 so that forward rotation with the third forward speed is output from the output gear 10. In this state, a third speed with a gear ratio of 1.556 is established by the gear ratio λ1 of the speed-reduction planetary gear SP and with the planetary gear unit PU directly coupled (λ=1). An adequate step ratio (the gear ratio of the second speed/the gear ratio of the third speed) of 1.509 is established between the second speed and the third speed.

When the fourth forward speed (4th) is established, as illustrated in FIG. 2, the first clutch C-1 and the second clutch C-2 are engaged. Then, in the speed-reduction planetary gear SP, rotation of the carrier CR1, which makes reduced-speed rotation with the sun gear S1 fixed and with the ring gear R1 making the input rotation, is input to the second sun gear S3 of the intermediate gear RS of the planetary gear unit PU via the first clutch C-1. In addition, rotation of the input shaft 2 is input to the second ring gear R3 through engagement of the second clutch C-2. Then, in the second planetary gear 6, with the reduced-speed rotation input to the second sun gear S3 and with the input rotation input to the second ring gear R3, rotation with a gear ratio higher than 1, which is the difference between the second sun gear S3 and the second ring gear R3, is output from the common carrier CR2 so that forward rotation with the fourth forward speed, which is reduced-speed rotation that is higher in speed than that with the third forward speed, is output from the output gear 10. In this state, a fourth speed with a gear ratio of 1.167 is established by the reduced-speed rotation of the speed-reduction planetary gear SP and the increased-speed rotation of the second planetary gear 6 of the planetary gear unit PU. Thus, an adequate step ratio (the gear ratio of the third speed/the gear ratio of the fourth speed) of 1.333 is established between the third speed and the fourth speed.

When the fifth forward speed (5th) is established, as illustrated in FIG. 2, the second clutch C-2 and the third clutch C-3 are engaged. Then, rotation of the carrier CR1, which makes reduced-speed rotation with the sun gear S1 fixed and with the ring gear R1 making the input rotation, is input to the first sun gear S2 of the planetary gear unit PU via the third clutch C-3. In addition, rotation of the input shaft 2 is input to the second ring gear R3 through engagement of the second clutch C-2. Then, in the planetary gear unit PU, with the reduced-speed rotation input to the first sun gear S2 and with the input rotation input to the second ring gear R3, increased-speed rotation, which is slightly higher in speed than the input rotation on the basis of the difference in rotational speed between the first sun gear S2 and the second ring gear R3, is output to the common carrier CR2 so that forward rotation with the fifth forward speed is output from the output gear 10. In this state, a fifth speed with a gear ratio of 0.845 is established by the reduced-speed rotation of the speed-reduction planetary gear SP and the increased-speed rotation of the planetary gear unit PU. Thus, an adequate step ratio (the gear ratio of the fourth speed/the gear ratio of the fifth speed) of 1.381 is established between the fourth speed and the fifth speed.

When the sixth forward speed (6th) is established, as illustrated in FIG. 2, the second clutch C-2 is engaged, and the first brake B-1 is locked. Then, rotation of the input shaft 2 is input to the second ring gear R3 through engagement of the second clutch C-2. In addition, rotation of the first sun gear S2 is locked by locking of the first brake B-1. Then, the input rotation of the second ring gear R3 is increased in speed by the first sun gear S2 which is fixed to be higher than the increased-speed rotation with the fifth forward speed and output to the common carrier CR2 so that forward rotation with the sixth forward speed is output from the output gear 10. In this state, a sixth speed with a gear ratio of 0.660 is established with rotation of the input shaft 2 significantly increased in speed by the planetary gear unit PU. Thus, an adequate step ratio (the gear ratio of the fifth speed/the gear ratio of the sixth speed) of 1.279 is established between the fifth speed and the sixth speed.

When the first reverse speed (Rev) is established, as illustrated in FIG. 2, the third clutch C-3 is engaged, and the second brake B-2 is locked. Then, in the speed-reduction planetary gear SP, rotation of the carrier CR1, which makes reduced-speed rotation with the sun gear S1 fixed and with the ring gear R1 making the input rotation, is input to the first sun gear S2 of the planetary gear unit PU via the third clutch C-3. In addition, rotation of the second ring gear R3 is locked by locking of the second brake B-2. Then, in the planetary gear unit PU, the reduced-speed rotation input to the first sun gear S2 is reversed by the second ring gear R3 which is fixed and output from the common carrier CR2 so that reduced-speed reversed rotation with the first reverse speed is output from the output gear 10. In this state, a reverse speed for reduced-speed reversed rotation with a gear ratio of 3.025 is established, and an adequate step ratio (the gear ratio of the reverse speed/the gear ratio of the first speed) of 0.778 is established between the reverse speed and the first speed. The automatic transmission 1 has a spread, which is the ratio between the first speed and the sixth speed, of 5.889, which is desirable for an automatic transmission.

In the parking (P) range and the neutral (N) range, for example, the first clutch C-1, the second clutch C-2, and the third clutch C-3 are disengaged. Then, the planetary gear SP and the planetary gear unit PU are disconnected from each other. In addition, the input shaft 2 (intermediate shaft 71) and the planetary gear unit PU are disconnected from each other. Consequently, power transfer between the input shaft 2 and the output gear 10 is cut off.

In the automatic transmission according to the first embodiment, the planetary gear unit PU has a two-storied structure in which the intermediate gear RS which is composed of the second sun gear S3 on the outer peripheral side and the first ring gear R2 on the inner peripheral side is interposed between the pinions P2 and P3 of the carrier CR2, and the planetary gear unit PU is generally as short in axial dimension as a single-pinion planetary gear. Thus, the entire automatic transmission 1, which is obtained by combining the planetary gear unit PU which is narrow and a speed-reduction gear mechanism formed of the single-pinion planetary gear SP which is simple, is short in axial dimension, which enables the automatic transmission 1 to be mounted even if an electric motor or a high-function damper device, for example, is interposed between the engine and the automatic transmission 1.

In order to make the planetary gear unit PU shorter in the axial direction, in addition, the planetary gear unit PU is configured such that the second planetary gear 6 is superposed on the radially outer side of the first planetary gear 5, which makes the planetary gear unit PU larger in the radial direction and makes it difficult to provide adequate gear ratios. In the planetary gear unit PU, rotation of the input shaft can be input to the second ring gear R3 on the radially outer side, rotation from the speed-reduction gear mechanism is selectively input to the intermediate gear RS and the first sun gear S2, and is output from the common carrier CR2. Consequently, multi-speed shifting with six forward speeds and one reverse speed, for example, with adequate gears, with step ratios becoming sequentially lower from the first speed toward the sixth speed, and without the gear ratios $\lambda 2$ and $\lambda 3$ having extremely large or small values can be obtained by selecting input using the clutches as appropriate and locking the elements as appropriate.

Figure 4:
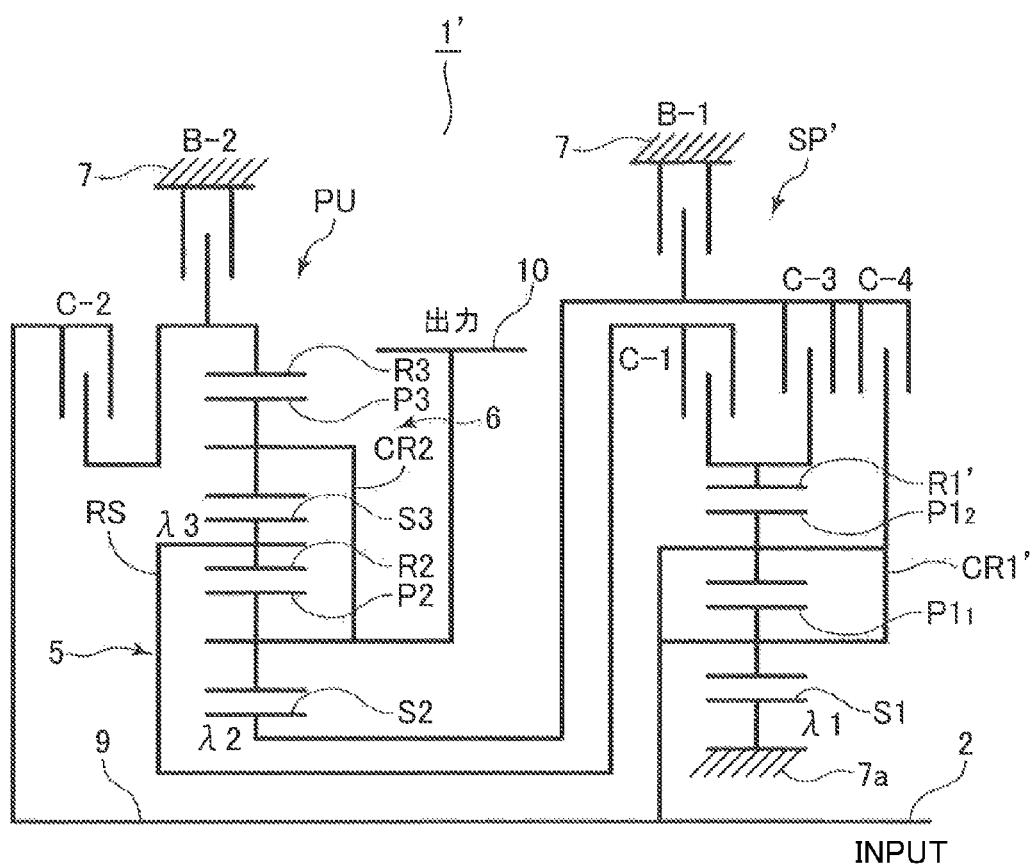
FIG. 4 is a schematic (skeleton) diagram of an automatic transmission according to a second embodiment of the present disclosure.
Figure 6:
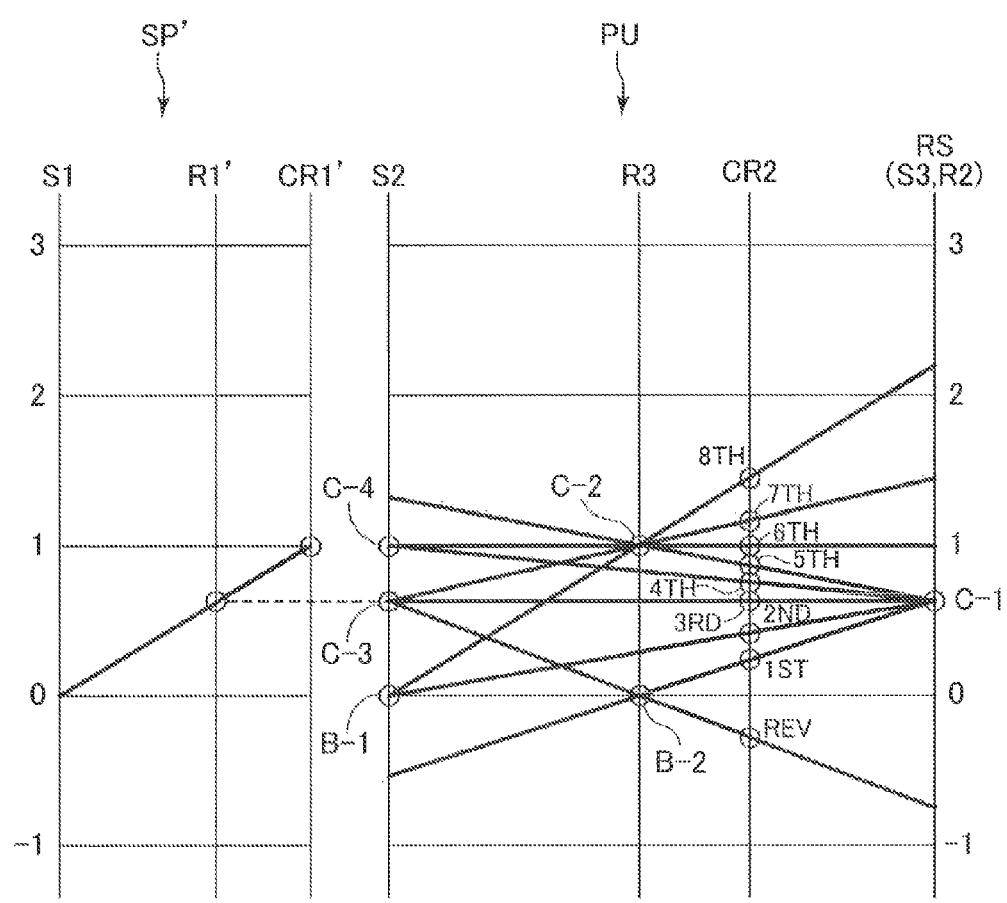
FIG. 6 is a velocity diagram therefor.

Next, a second embodiment of the present disclosure will be described with reference to FIGS. 4 to 6. An automatic transmission according to the second embodiment additionally includes a fourth clutch C-4 that are capable of coupling the input portion (2, 9) and the first sun gear S1 of the planetary gear unit PU to each other, and establishes eight forward speeds. Components of the second embodiment that are the same as those of the first embodiment such as the planetary gear unit PU are given the same reference numerals to omit description.

In the second embodiment, a speed-reduction planetary gear SP' that includes a speed-reduction gear mechanism is formed of a double-pinion planetary gear composed of the sun gear S1, a ring gear R1', and a carrier CR1' that rotatably supports a first pinion $P1_1$ and a second pinion $P1_2$, the first pinion $P1_1$ being meshed with the sun gear S1, and the second pinion $P1_2$ being meshed with the ring gear R1' and meshed with the first pinion $P1_1$. In the planetary gear SP', the sun gear S1 is fixed, the carrier CR1 is integrally coupled to the input shaft (portion) 2, and the ring gear R1' serves as a reduced-speed rotation output portion (reduced-speed rotation output). Thus, the ring gear R1' which serves as the reduced-speed rotation output portion is coupled to the first sun gear S2 of the planetary gear unit PU via the third clutch C-3, but does not interfere with the coupling, and the carrier CR1 which is integral with the input shaft 2 can extend radially outward on the side opposite to the planetary gear unit PU to be coupled to the first sun gear S2 via the fourth clutch C-4.

In the speed-reduction planetary gear SP', rotation of the carrier CR1' from the input shaft 2 is reduced in speed with the gear ratio $\lambda_1$, and rotation in the same direction as that of the input shaft 2 is output from the ring gear R1'. The fourth clutch C-4 is added in addition to components that are similar to those of the first embodiment, namely the first clutch C-1, the second clutch C-2, the third clutch C-3, the first brake (lock) B-1, and the second clutch (lock) B-2, and the clutches and the brakes are engaged as appropriate to establish eight forward speeds and one reverse speed as illustrated in FIGS. 5 and 6.

Here, the first speed (1st), the second speed (2nd), and the third speed (3rd) are the same as those according to the first embodiment discussed earlier, the fifth speed (5th), the seventh speed (7th), and the eighth speed (8th) are the same as the fourth speed, the fifth speed, and the sixth speed, respectively, according to the first embodiment, and description of such speeds is omitted.

When the fourth speed is established, the first clutch C-1 is engaged to transfer reduced-speed rotation from the ring gear R1' of the speed-reduction planetary gear SP' to the intermediate gear RS, and the fourth clutch C-4 is engaged to transfer input rotation of the carrier CR1' from the input shaft 2 to the first sun gear S2, so that the planetary gear unit PU outputs predetermined reduced-speed rotation from the common carrier CR2 to the output gear 10.

When the sixth speed is established, the second clutch C-2 is engaged to transfer rotation of the input portion 2, 9 to the second ring gear R3, and the fourth clutch C-4 is engaged to also transfer rotation of the input portion 2 to the first sun gear S2. Consequently, the speed-reduction planetary gear SP' and the planetary gear unit PU are rotated together with each other so that rotation of the input shaft 2 is output to the output gear 10 via the common carrier CR2.

Also in the automatic transmission 1' according to the second embodiment, as in the first embodiment, the planetary gear unit PU has a two-storied structure, and the speed-reduction gear mechanism includes a double-pinion planetary gear to have a short axial dimension, which makes the automatic transmission 1' more compact, in particular in the axial direction. In the speed-reduction planetary gear SP', in addition, the ring gear R1' serves as a speed-reduction output portion, and thus the fourth clutch can be interposed between the carrier which is coupled to the input portion and the first sun gear S1. This makes it possible to easily establish eight speeds, and obtain eight-speed shifting with adequate gear ratios from the first speed to the eighth speeds as illustrated in FIG. 6.

In the automatic transmission, a single-pinion planetary gear and a double-pinion planetary gear are used as the speed-reduction gear mechanism. However, a different speed-reduction gear mechanism such as a different planetary gear or a parallel-axis speed-reduction gear device may also be used. Moreover, a different combination may also be used for the input element as the input portion, the output element which serves as the reduced-speed rotation output portion, and so forth. As a matter of course, in addition, the double-pinion planetary gear PU' may also be applied to a six-speed transmission with the fourth clutch omitted.

INDUSTRIAL APPLICABILITY

The automatic transmission according to the present disclosure is mounted on an automobile to be utilized.

The invention claimed is:

1. An automatic transmission comprising:
a reduced-speed rotation output that outputs input rotation of an input with a speed of the input rotation reduced; and
a planetary gear set that has a first sun gear, an integral intermediate gear in which a first ring gear is formed on an inner peripheral side and a second sun gear is formed on an outer peripheral side, a second ring gear, and a common carrier that rotatably supports a first pinion and a second pinion, the first pinion being meshed with the first sun gear and the first ring gear, and the second pinion being meshed with the second sun gear and the second ring gear and disposed so as to at least partially overlap the first pinion in an axial direction as seen from a radial direction, wherein the intermediate gear and the reduced-speed rotation output are coupled to each other via a first clutch, the second ring gear and the input are coupled to each other via a second clutch, the first sun gear and the reduced-speed rotation output are coupled to each other via a third clutch, the first sun gear is coupled to a first lock, the second ring gear is coupled to a second lock, and the common carrier is coupled to an output member.

2. The automatic transmission according to claim 1, wherein:
a first forward speed is established by engaging the first clutch and the second lock;
a second forward speed is established by engaging the first clutch and the first lock;
a third forward speed is established by engaging the first clutch and the third clutch;
a fourth forward speed is established by engaging the first clutch and the second clutch;
a fifth forward speed is established by engaging the second clutch and the third clutch;
a sixth forward speed is established by engaging the second clutch and the first lock; and
a reverse speed is established by engaging the third clutch and the second lock.

3. The automatic transmission according to claim 2, further comprising:
a speed-reduction gear mechanism that outputs the input rotation of the input to the reduced-speed rotation output with the speed of the input rotation reduced, wherein:
the speed-reduction gear mechanism includes a single-pinion planetary gear that includes a sun gear, a ring gear, and a carrier that has a pinion meshed with the sun gear and the ring gear; and
the sun gear is fixed, the ring gear is coupled to the input, and the carrier serves as the reduced-speed rotation output.

4. The automatic transmission according to claim 1, further comprising:
a fourth clutch that is capable of coupling the input and the first sun gear to each other, wherein:
a first forward speed is established by engaging the first clutch and the second lock;
a second forward speed is established by engaging the first clutch and the first lock;
a third forward speed is established by engaging the first clutch and the third clutch;
a fourth forward speed is established by engaging the first clutch and the fourth clutch;
a fifth forward speed is established by engaging the first clutch and the second clutch;
a sixth forward speed is established by engaging the second clutch and the fourth clutch;
a seventh forward speed is established by engaging the second clutch and the third clutch;
an eighth forward speed is established by engaging the second clutch and the first lock; and
a reverse speed is established by engaging the third clutch and the second lock.

5. The automatic transmission according to claim 4, further comprising:

a speed-reduction gear mechanism that outputs the input rotation of the input to the reduced-speed rotation output with the speed of the input rotation reduced, wherein:

the speed-reduction gear mechanism includes a double-pinion planetary gear that includes a sun gear, a ring gear, and a carrier that has a first pinion and a second pinion, the first pinion being meshed with the sun gear, and the second pinion being meshed with the ring gear and meshed with the first pinion; and the sun gear is fixed, the carrier is coupled to the input, and the ring gear serves as the reduced-speed rotation output.

* * * * *